United States Patent Office 3,496,902
Patented Feb. 24, 1970

3,496,902
PREVENTING LOST CIRCULATION DURING
EARTH BOREHOLE DRILLING
James M. Cleary, Falmouth, Mass., and Loyd R. Kern, Irving, and Thomas K. Perkins, Dallas, Tex., assignors to Atlantic Richfield Company, Philadelphia, Pa., a corporation of Pennsylvania
No Drawing. Continuation-in-part of application Ser. No. 531,764, Mar. 4, 1966. This application Apr. 24, 1968, Ser. No. 723,944
Int. Cl. E21b 21/04
U.S. Cl. 175—72                           15 Claims

ABSTRACT OF THE DISCLOSURE

A drilling method for preventing loss of circulation wherein there is circulated a unique drilling mud or liquid-slurry admixture before any lost circulation occurs. The admixture is made up of a base liquid drilling mud slurry containing at least one percent by volume of small particles of graded size distribution between clay size and 0.0029 inch and having an API fluid loss of less than 50 cc., and 5 percent or more by volume of a select batch of solid particles passing through U.S. Sieve Series Screen 10 and retained on U.S. Sieve Series Screen 100, and of graded size distribution, strength, chemical resistance and amount such that the spurt of the admixture is less than 300 at a test pressure of 1500 pounds per square inch or greater through all crack widths between 0.02 inch and 0.06 inch. The largest size particles in the batch are at least U.S. Sieve Series Screen 10 (0.0787 inch).

CROSS-REFERENCE TO RELATED APPLICATION

This application is a continuation-in-part of copending application Ser. No. 531,764, filed Mar. 4, 1966, by the same inventors as this application, now abandoned, and which is a continuation-in-part of application Ser. No. 297,960, filed July 26, 1963, which has been since abandoned.

BACKGROUND OF THE INVENTION

This invention pertains to a method of earth borehole drilling and more particularly, to a method for preventing loss of circulation during earth borehole drilling by controlling the loss of liquids and liquid-solid particle mixtures through either naturally occurring or hydrostatic pressure induced cracks in an earth formation.

During earth drilling, a drilling mud is circulated through the borehole being drilled. The costly loss of drilling muds into earth formations has long been recognized as a major, reoccurring problem. Numerous materials and ways to combat this loss have been suggested. The ways of combating mud loss are usually directed to one of four types of processes for overcoming mud losses. In all of these processes, the ultimate result is to seal an opening.

The first and most widespread process for preventing mud loss is directed to the loss that occurs when a drilling mud is circulated past a porous formation. Liquid in the mud seeps through small pores in the formation. This is primarily a liquid loss problem and is usually prevented by increasing the viscosity of the mud and by suspending small clayey-size particles in the mud. Muds thus treated are called low fluid loss muds. There exists a large quantity of art dealing with this first type of fluid loss.

The second and third processes for preventing mud loss are aimed at stopping the loss of whole mud into fissures, vugs and other cavities in a subsurface earth formation after a substantial amount of whole mud has been lost. The term whole mud refers to solids in the mud as well as the base liquid used to form the mud. The large amount of art dealing with the loss of whole mud refers to this problem as lost circulation. There may be a partial loss of circulation or a total loss of circulation. Total lost circulation occurs when none of the mud will circulate. Partial lost circulation occurs when only a part of the mud will circulate. Processes aimed at overcoming lost circulation are generally referred to as curing lost circulation; however, it is also common practice to refer to these processes as preventing lost circulation especially in those situations where total lost circulation has not yet occurred. As a result, the terms preventing and curing are generally used interchangeably. In reality all such processes are curative in nature rather than preventive. In either case, a standard low fluid loss mud is circulated until there is a noticeable decrease in the amount of mud returning to the surface. When this decrease in circulation is noted, a special preventive or curative slurry is prepared and injected into the opening causing lost circulation. This special slurry contains a group of different size particles which are designed to bridge and plug the opening causing lost circulation. The group of particles usually contains particles greater than 0.25 inch which form a bridge or plug in the opening rather than over the opening. Otherwise, these large size particles would greatly reduce the hole diameter and interfere with movement of the drill bit. All sorts of materials, particle size distributions and concentrations have been suggested for use as plugs for overcoming lost circulation. In these second and third processes, the only purpose of the special slurry is to form a plug of solid materials.

The fourth type of process for preventing mud loss is directed to automatically decreasing the amount of whole mud lost to cracks in the subsurface formation. The purpose of this fourth type of process is to seal openings before appreciable amounts of lost circulation occur. This is accomplished by adding particulated matter to the drilling mud. This particulated matter is referred to as loss circulation material and is added in small concentrations. It is accepted practice to add between 1 and 7 pounds per barrel of mud. The drilling mud with the loss circulation material added is circulated with the hope that such material will be strained out of the mud as the mud flows through the crack in the formation. It is hoped that the particles will strain out of the mud and eventually form a filter cake of low permeability thereby plugging the crack. The plug formed by these particles may be in the crack or over the mouth of the crack. This fourth type of process is said to be preventive in nature in that it is supposed to automatically prevent uncontrolled loss of whole mud. It is standard practice to test the effectiveness of this fourth type of process by flowing the admixture at a low pressure through a fixed width crack to see if the admixture will eventually bridge or plug the crack. After the plug forms, the test pressure may or may not be raised to test the strength of the particles. Therefore, the fourth process is like the second and third processes in that the only purpose contemplated is the eventual formation of a plug in or on a crack. This fourth type of process differs in that the particles are circulated. Naturally, since it is easier to circulate small particles, these processes are directed to the use of small particles and small openings or cracks.

Naturally, in order to carry out the forementioned four processes, the art refers to the use of many different chemically resistant materials, the use of a wide range of concentrations of particles, the use of graded size particles and the use of strong particles; however, actual use of all the mixtures suggested in the art proves that the mixtures offer little real preventive value, and any benefits derived from the use of such mixtures is a hit-and-miss proposition of indeterminable worth. True preventive mixtures must be used before any appreciable lost circulation occurs. Preventive admixtures are much more expensive than ordinary low fluid loss muds and create collateral problems; therefore, even if one knew in advance exactly when lost circulation is likely to be encountered, the use of such highly expensive preventive admixtures can be justified only if there is reliable certainty that the process will be successful should a crack occur.

Accordingly, it is an object of this invention to provide a reliable method of earth borehole drilling which prevents lost circulation by preventing the loss of whole mud or admixture through cracks in an earth formation when the admixture is subjected to pressures sufficient to otherwise cause such loss. The preventive method uses a liquid-solid particle admixture which will quickly bridge and seal the mouth of a crack in the formation in a manner such that the admixture offers a high degree of success for preventing loss of the admixture to the crack.

A further object is to provide a method for preventing such loss in the majority of formations wherein such loss is prevalent.

Still another object of this invention is to provide a method of earth borehole drilling using a liquid-solid particle admixture that lacks the ability to enter a crack in the formation and cause the aforementioned losses.

Various other objects and advantages will appear from the following description.

SUMMARY OF THE INVENTION

This invention provides a method for preventing loss of circulation while earth borehole drilling. In this drilling method, it is essential that a special drilling liquid-solid particle admixture be injected into the well bore and caused to circulate and contact the wall of the borehole during drilling of at least a part of the borehole.

It is also imperative that the special drilling admixture have a spurt of less than 300 at a test pressure of at least 1500 pounds per square inch through all crack widths between 0.02 inch and 0.06 inch. The spurt of the admixture is critical to the accomplishment of the objects and discoveries of this invention. The spurt is also the only effective way of measuring all the interrelated properties of the ingredients of the special drilling admixture insofar as these ingredients and properties are required for the objects and discoveries of this invention.

The special drilling admixture must have both the preset low initial spurt and thereafter a low fluid loss. In order to have both a low spurt and a low fluid loss, the special admixture is made up of a base liquid slurry which must have an API fluid loss of less than 50 cc. and contain at least one percent by volume of small particles of a size distribution between clay size and 0.0029 inch.

Admixed with the base liquid slurry is a batch of solid particles having a graded size distribution between 0.0059 inch and 0.0787 inch. The size distribution is graded when there are different sized particles covering this particle size range. The size of largest size particles are at least U.S. Sieve Series Screen 10 (that is, 98 percent of the particles will pass through a 10 mesh screen, but 98 percent will not pass through a 12 mesh screen). This size is required for a crack width of 0.06 inch, that is, approximately 75 percent of (0.0787). In one embodiment, the size of the largest size particles is limited to being 10 mesh or 8 mesh.

The amount of particles in a select batch of solid particles having a size greater than 0.0059 inch and less than 0.0787 inch must be at least 5 percent by volume of the final admixture. It should be noted that this amount is expressed in terms of volume instead of pounds and in terms of a volume percent of final admixture. Thus, for each barrel of base liquid slurry there must be added at least 2.2 gallons of solid particles between 0.0059 inch and 0.0787 inch. This minimal amount of particles between 0.0059 inch and 0.0787 inch is determined by volume percent of the particles in the admixture and not by the weight of the particles. This minimal amount is also for the minimal size range of 0.0059 inch to less than 10 mesh, and is based on experimental data and theoretical calculations assuming all the particles act in their most efficient manner. Actually, greater amounts are needed.

The strength, size distribution and chemical resistance of the particle must be such that a thin bridge of the particles will withstand a pressure differential of 1500 p.s.i. when the thin bridge is formed over all crack widths between 0.02 inch and 0.06 inch.

The strength, size distribution, chemical resistance, and amount as well as other properties of the particles and admixture are further controlled and established by requiring that the admixture exhibit a spurt of less than 300 through all crack widths between 0.02 inch and 0.06 inch at a test pressure of 1500 pounds per square inch.

In other more preferred embodiments of this invention, the special drilling admixture has a spurt of less than 100. In one embodiment, the spurt is less than 100 at a test pressure of 1500 pounds per square inch through a crack whose width is between 0.02 inch and 0.06 inch. This is necessary for intermediate areas of loss of circulation. For more critical areas of loss of circulation, in other embodiments, the spurt is less than 100 through all crack widths between 0.02 inch and 0.06 inch at both 1500 pounds per square inch and at 3000 pounds per square inch.

For more severe areas of loss of circulation the special drilling admixture has a spurt of less than 60. One such admixture has a spurt of less than 60 at a test pressure of 1500 pounds per square inch for all crack widths between 0.04 inch and 0.06 inch since this is the most critical range of crack widths within the 0.02 inch to 0.06 inch range. For the most critical areas, in other embodiments, the spurt is less than 60 at 1500 and 3000 pounds per square inch through all crack widths between 0.02 inch and 0.06 inch and preferably between 0.02 inch and 0.07 inch.

The spurt requirements of some embodiments is further restricted thereby restricting the properties of the admixture and its ingredients by requiring that the admixture be subjected to elevated temperaures of 150 and 300 degrees Fahrenheit for a period of one day and longer up to 45 days.

The preferred size distribution for the more stringent admixtures is such that the gradation of the solid particles passing through a U.S. Sieve Series Screen 10 (0.0787 inch) and retained on a standard U.S. Sieve Series Screen 100 having a sieve opening of 0.0059 inch approximates the relationship $$\frac{V}{V_t} = \frac{\ln \frac{S}{0.0787}}{\ln \frac{0.0059}{0.0787}}$$

wherein S is the size of the opening in inches of a standard U.S. Sieve Series Screen between 0.0787 and 0.0059 inch, V is the volume of the particles retained on said screen of size S, and $V_t$ is the total volume of said solid particles retained on said screen of size 0.0059 inch.

When the spurt of the admixture is below 100 through a wide range of cracks, e.g. 0.02 inch to 0.06 inch, the preferred minimum concentration of the batch of solid particles between 0.0059 inch and 0.0787 inch is increased to at least ten percent by volume and the concentration of the small particles in the base slurry to at least two percent by volume. For a spurt below 60 through this wide range of cracks, the preferred minimum concentration of the batch of particles between 0.0059 inch and 0.0787 inch is at least 15 percent by volume.

DESCRIPTION OF THE PREFERRED EMBODIMENTS

This invention provides a method for preventing loss of circulation while earth borehole drilling. The drilling method of this invention involves circulating a unique drilling mud or liquid-slurry admixture before loss of circulation occurs. This unique drilling mud is circulated while drilling so that the unique slurry will be in contact with the walls of the open hole and be present the moment that a crack opens in the wall of the borehole. The drilling fluid has special properties which prevent lost circulation both at the moment that the crack opens and as time passes and the crack geometry changes.

As will be hereinafter explained, the special properties of the drilling mud are related to the spurt of the drilling fluid through all cracks whose widths are between 0.02 inch and 0.06 inch and greater. Some of the properties of the special drilling fluid are given in terms of spurt because spurt alone controls the success of the drilling fluid for the solution of this invention and because the spurt under the preset conditions controls and defines the relationship between the properties of the ingredients of the special drilling mud.

In order to aid in an understanding of the features of this invention, there will first be given a simplified theory of this solution for preventing lost circulation. It is to be understood that this explanation of the theory is simplified and that this invention is not to be limited to the following explanation of theory.

During earth drilling, a crack will develop in a subsurface formation when the pressure of the drilling fluid exceeds the breakdown stresses of the formation.

The formation has a number of properties that are considered in this solution as will be hereinafter pointed out. For this simplified summary, it is only necessary to point out that the permeabilities and stress levels of formations vary. Permeability ranges between the permeability of highly permeable formations to the permeability of those formations which have no practical permeability. In the more critical areas of lost circulation, the formation has no practical porosity and permeability. It is in these formations that lost circulation is most costly. It is also in these formations that it is most difficult to prevent loss of circulation. In the hereinafter described Table I, these formations are classified as the severest and most critical areas. These latter formations require the lowest spurt values and involve the greatest pressures and the highest temperatures.

During drilling, mud pressure causes the formation to fracture. A porous formation has a migratable pore fluid which is at formation pressure and which is relatively free to flow into the crack. On the other hand, in the most critical areas, the formation has no practical porosity or permeability; consequently, there are no readily migratable formation fluids to flow from the formation into the crack. By the same token, since these latter formations are impermeable, no fluid readily flows from the crack into the formation. At the moment that the formation breaks down, a crack is formed. The incipient width of this crack will depend on the breakdown pressure and the properties of the formation. In porous formations wherein migratable formation fluids are present, the incipient or primary crack width will be between 0.02 inch and 0.05 inch. In nonporous formations, the incipient crack width will be smaller; however, because there is no permeability, the crack width increases to 0.02 inch and greater in such a short time that the drilling mud (regardless of its properties) cannot prevent or retard widening of the incipient crack. If the particles in the drilling mud acted quickly enough to seal the crack before it widened to 0.02 inch, the pressure differential across the bridge would be so great that no bridge or formation could withstand this pressure differential. There is no migratable formation fluid to reduce this pressure differential across the bridge as there is in permeable formations. Pressure differentials greater than 10,000 pounds per square inch could develop if the seal and formation were strong enough to withstand this pressure differential without failing. Of course, formations and thin seals of small particles are not that strong.

Thus, this new solution depends on a new theory of preventing lost circulation and absolutely requires that the drilling fluid be designed to bridge in a "controllable manner" (as hereinafter shown) incipient cranks between 0.02 inch and 0.06 inch and greater.

As already indicated and as is hereinafter explained, it is not enough that the drilling fluid bridge incipient cracks or quickly widening cracks.

First, consider the relatively mild case where the crack forms in a porous formation containing migatable fluid pressure. When drilling mud penetrates the crack, the pressure required to lengthen and widen the crack is less than the breakdown pressure. The crack, therefore, lengthens and widens at a rate depending on the rate of liquid flow into the crack. As the crack width increases, the rate of widening decreases; that is, the crack lengthens at a much greater rate than it widens. Further, the liquid entering the crack can leak off into the formation since the formation is permeable. The amount of leak off is, of course, dependent on the area of flow. The area of flow increases as the crack length increases. If this crack is bridged, the rate of fluid entry into the crack may be reduced to a point where the crack will not widen further because the rate of leak off is as great as the rate of fluid entry. In the event that the rate of fluid entry is less than the rate of leak off, the formation fluid pressure is exerted in the crack since there is migratable formation fluid in a porous, permeable formation. The pressure differential across the bridge is kept low. This pressure differential will be on an average of about 1500 pounds per square inch and greater for porous formations where loss of circulation is caused by fracturing the formation. Thus, for these less stringent formations, according to this invention, the special drilling mud must seal incipient cracks between 0.02 inch and 0.06 inch, must exhibit a spurt at a pressure of 1500 pounds per square inch as measured by the amount of mud entering a given crack width before the bridge forms) which is low enough to control the width of the crack to less than the particle size, and must form a bridge that will withstand this 1500 pounds per square inch differential. The allowable spurt for permeable porous formations according to this solution must be less than 300 for all formations studied regardless of nature; however, as hereafter pointed out, this high a spurt is allowed in only the mildest permeable formations and in reality the spurt must be much lower for most formations where lost circulation is a major problem. The factors governing the allowable spurt are hereinafter set forth. The allowable amount of mud and filtrate entering the crack is critically set by these factors and the relation between porosity, rate of lengthening per unit width and rate of widening per unit length.

Secondly, in more critical areas, the formation is impermeable and has no practical migratable pore pressure (formation fluid pressure). All of the drilling mud entering the crack goes to widen and lengthen the crack as there is no leak off to the formation and there would be no place for the mud to go if the crack did not lengthen and widen. Thus, the incipient crack widens so quickly that no drilling mud could act quickly enough to seal the crack until the crack is on the order of 0.02 inch or greater. When the crack is bridged, two things can happen. If the bridge were completely impermeable, the pressure differential across the bridge could increase to pressures on the order of 10,000 pounds per square inch and greater as there is no migratable formation fluid pressure. Under these conditions, the bridge or the formation would fail again to a wider crack. If the bridge leaked filtrate, as it always will at this pressure, the filtrate entering the crack must widen and lengthen the crack. There is no other place for the filtrate to go since the formation is essentially impermeable. Thus, the crack lengthens and widens until the bridge fails and the mud again spurts into the crack. The special mud of this invention will quickly form a new bridge on this widened crack. This process is repeated over and over again and each time the mud must bridge a wider, longer crack. Near the end of the process, it will take days for the crack to widen enough to cause the bridge to fail again and at that instant, if the well is still being drilled, the special drilling mud must be present to act again. The special drilling fluid is, therefore, circulated during drilling. In the process of this invention, the mud must have a continuous range of particles to seal crack widths at least between 0.02 inch and 0.06 inch. According to this solution, the admixture is designed to bridge the crack each time the crack widens enough to cause the previous bridge to fail. At the pressures encountered, it takes only a small increase in crack width to cause the bridge to fail; consequently, the special drilling admixture performs equally well through a continuous range of crack widths starting at 0.02 inch and up to 0.06 inch. Preferably, for sake of safety, the spurt will be low through cracks up to 0.07 inch. The admixture can be designed for an even greater crack width range if desired. Fortunately, as pointed out, the rate of crack widening per unit increase in length decreases as the crack widens. As a result, when the crack width is between 0.04 inch and 0.06 inch, most of the filtrate through the bridge goes to lengthen the crack rather than widen it. This solution is geared to controlling the balance between filtrate rate and the crack widening and lengthening rates until enough time is allowed for the well to be completed or for this section of the borehole to be cased off. Also, as indicated previously, the pressure differential across the bridge is much greater than in porous formations. There is no migratable formation fluid pressure and no permeability to help reduce the pressure differential. If the filtrate leaked through the bridge at a rate sufficient to build up enough pressure in the crack to reduce the pressure differential, control of the crack growth would be lost because the pressure inside the crack would be too great. As a result, the pressure differential is on the order of 3000 pounds per square inch and greater.

Since there is no fluid leak off to the formation through walls of the crack, the allowable spurt, both at the moment that the crack reaches 0.02 inch and each time the bridge fails, must be much lower than 300. The spurt must be less than 100 and preferably less than 60 for all the crack widgths between 0.02 inch and 0.06 inch.

Thus, the solution of this invention for areas where lost circulation is most critical requires that the drilling fluid have a continuous range of particles between 0.02 inch and 0.06 inch and greater, that the spurt at 3000 pounds per square inch be less than 100, and that the bridge withstand pressure differentials of at least 3000 pounds per square inch.

The above summary of the theory behind the solution of this invention aids in an understanding of the following more detailed description of the features of this invention.

This invention provides an improved method of drilling at least a part of an earth borehole. In this method, there is injected into a borehole an admixture of special drilling mud slurry. The admixture is made up of a base liquid slurry containing at least one percent by volume of small particles having a size distribution between clay size and 0.0029 inch and having an API fluid loss of less than 50 cc. There is added to this base liquid slurry a batch of solid particles of graded size distribution, strength, chemical resistance and amount such that the spurt of the admixture is less than 300 at a test pressure of 1500 pounds per square inch through all crack widths between 0.02 inch and 0.06 inch. The largest size particles are at least U.S. Sieve Series Screen 10 (0.0787 inch), as hereinbefore defined. The amount of the solid particles having a size greater than 0.0059 inch (i.e., retained on a U.S. Sieve Series Screen 100) and a size less than 0.0787 inch (i.e., passing through a U.S. Sieve Series Screen 10) are at least five percent by volume of the admixture This admixture is circulated to contact the wall of the borehole during the drilling of at least a part of the borehole. These are the absolute minimal requirements for the special drilling mud or admixture of this invention; as mentioned previously, this invention includes within its scope other more limiting properties for the special drilling admixture as hereinafter described. It is especially important to note that in its most limited form the special drilling admixture has a spurt of less than 60 for all cracks between 0.02 inch and 0.06 inch and much higher concentrations of 10–100 mesh particles.

As used herein, spurt is a special dimensionless value not used in the art. Mathematically, spurt is the depth of penetration of the liquid into a crack divided by the width of the crack; or spurt is the volume of liquid spurting into the crack per unit of crack divided by the square of the width of the crack, all units being uniform. Briefly, the spurt of an admixture of liquid and solid particles is determined by accurately measuring the volume of admixture flowing into and through a crack opening of determinable width and length when the admixture is pressurized to a predetermined pressure. Increasing the test pressure increases the spurt of an admixture. A thorough appreciation of the reasons for using this concept of spurt is essential to an understanding of this invention. First and of primary importance, the spurt value at a given test pressure shows the ability or lack of ability of the admixture to enter a crack in the formation and cause the aforementioned losses. For the purposes of this invention, it is essential that when subjected to the pressure conditions set forth herein, the spurt of the admixture through all cracks whose widths are between 0.02 inch and 0.06 inch be as stated. Second, this concept of spurt is used because this one feature of the admixture involves an interrelation of all of the pertinent properties and ingredients of the admixture. The spurt of the admixture is reduced to the values set herein only by careful selection of the qualities and physical properties of the admixture and the ingredients of the admixture.

As stated previously, the spurt that can be tolerated depends on the nature of the formation, crack geometry, and effective stresses within the borehole and formation. Thus, the desired spurt depends upon such factors as the formation fluid pressure, well bore fluid pressure, total horizontal stress, effective horizontal stress in the formation, effective tangential stress, well bore radius, Young's modulus for the formation, Poisson's ratio, incipient crack width and formation permeability. From empirical data, simulated crack model studies, formation sample analyses in areas where lost circulation occurred, and observations of hydrostatic pressure induced fractures, it was found that reliable limits could be placed on the spurt of the drilling admixture and the extent of protection based on the number of different formations wherein lost circulation may be prevented could be predicted. Table I shows the extent of protection derived from use of drilling admixtures having different spurt values at different test pressures and temperatures.

TABLE 1

| Spurt | Conditions | | Extent of Protection |
|---|---|---|---|
| | Pres., p.s.i. | Temp., °F. | |
| 0–60 | 3,000–6500 | 300–350 | Protection in all areas. |
| Less than 100 [1] and 0–60 [2] | 1,500–3,000 | 150–300 | Protection in all but severest areas. |
| Less than 100 [1] | 1,500–3,000 | 150–300 | Protection in majority of areas. |
| 100–300 [1] and less than 100.[2] | 1,500–3,000 | 150–300 | Protection in many areas. |
| 100–300 [1] | 1,500 | 70–150 | Certain protection in a few areas. |
| 100–300 [2] and greater than 300 [2] | 1,000–1,500 | 70–150 | Uncertain protection in a few areas. |
| Greater than 300 [3] | 1,000–1,500 | 70–150 | No protection. |

[1] For all crack widths between 0.02 inch and 0.06 inch and preferably up to 0.07 inch.
[2] For a crack whose width is between 0.02 inch and 0.06 inch.
[3] For all crack widths between 0.02 inch and 0.06 inch.

Briefly summarized, Table I shows that when the spurt is greater than 300 at a test pressure of at least 1000 pounds per square inch for all crack widths between 0.02 inch and 0.06 inch, there is no protection and the drilling mud admixture will enter the crack at a rate sufficient to cause appreciable, adverse loss of the admixture, or liquid in the admixture, in all formations wherein such loss is a problem. When the spurt is less than 300 at a test pressure greater than 1000 pounds per square inch for some cracks whose widths are between 0.02 inch and 0.06 inch, but greater than 300 for other cracks in this range, it is doubtful that circulating such a drilling admixture will provide any protection under any conditions. It might help in the mildest of formations, but this is doubtful. When, however, there is circulated a drilling admixture having a spurt of less than 300 at a test pressure of 1500 pounds per square inch through all crack widths between 0.02 inch and 0.06 inch, there is certain protection in a few of the mild areas of loss of circulation. The extent and reliability of protection increases as the spurt of the admixture is reduced at elevated pressures and temperatures with the optimum spurt being less than 60 at a test pressure of at least 3000 pounds per square inch for all crack widths between 0.02 inch and 0.06 inch at a temperature of at least 300° F.

It is important to an understanding of this invention to note that when an admixture has a spurt low enough to show that the admixture will not enter the crack in sufficient amounts at a rate great enough to cause the forementioned losses, the seal foremd by the admixture on the crack is a relatively thin, impermeable bridge formed at the mouth of the crack. The original bridge is not formed in the crack, nor is the spurt of the admixture merely a measure of its ability to eventually bridge or plug the crack. Many slurries which eventually plug or bridge a fixed width crack will lose enough fluid to the crack to cause the losses that this invention prevents. This illustrates the second reason for using the concept of spurt of this invention. For an admixture to have the low spurt values set herein, the chemical and physical properties of the admixture and its ingredients are limited relative to each other and to the range of the crack widths covered. The spurt limits used herein place relative limits on such properties as the shape of the larger particles of a certain particulated matter, homogeneity of the admixture, the location of the bridge over the crack opening, the location of the different size particles in the bridge, the thickness of the bridge, the size of the particles relative to the range of crack widths for which the admixture exhibits the desired spurt value, the relative sizes and distribution of the particles added to the base liquid slurry, the strength of the bridge both immediately upon adding the particles to the base liquid and after the particles have been subjected to this liquid for an extended period of time, the fluid loss characteristics of the base liquid slurry, the concentration of the particles in the base liquid as determined by the volume percent of each size particle in the final mix, the temperature and chemical resistance of the particles to the fluids and conditions encountered in the well bore, aging effects of the particles on the properties of the base liquid slurry, and other related properties. It should be noted and re-emphasized that many of the above properties are interrelated; therefore, the over-all properties of the admixture must be considered. By way of illustration, an admixture having a spurt below 100 at 1500 pounds per square inch will necessarily form a very thin bridge over the fracture and the particles in this thin bridge must correspondingly be very strong. Since the bridge is thin and strong, the amount of degradation that the particles can undergo when subjected to borehole conditions for periods up to 45 days is greatly limited. If the particles do not degrade, they do not dissolve, agglomerate, soften or break up quickly and greatly change the size distribution, and do not adversely affect the properties of base liquid slurry. In many cases, a thin bridge will have the necessary strength only if the particles are unusually strong. Many materials will possess this strength only if the large size particles have a definite shape. The shape of the particles affects the concentration of the particles needed. The spurt of the admixture measures the over-all combined result of all of the properties which if measured singly and independently have little meaning.

The foregoing should provide a better appreciation of the spurt of an admixture and why it is impractical to attempt to define or treat separately each individual characteristic feature of the particles and the slurry to which these particles are added. The above comments should be kept in mind when reading the following brief description of the more important features of the ingredients of the admixture and their desired properties.

As stated previously, the spurt values of Table I were obtained only by careful selection of the properties of the admixture and of its ingredients. The more important properties are summarized below.

(1) The base liquid to which the particulated matter is added is any water, starch, clay, gum, oil, silicate, asphalt, oil-in-water, water-in-oil, or a like base slurry—all containing sufficient clayey size particles to reduce the fluid loss of the base liquid. The fluid loss should be less than 50 cc. when determined at the earth's surface according to the standard low pressure test procedures described in a publication by The American Petroleum Institute entitled, "API RP 29, fourth edition, May 1957, Recommended Practice, Standard Field Procedure for Testing Drilling Fluids." It has been found that in the more critical areas of lost circulation and the like that the API fluid loss of the base liquid should be less than 10 cc. and as close to zero as is practical. In very deep, high pressure systems wherein the loss frequently occurs, it is desired that the API fluid loss of the base liquid be less than 5 cc. Fortunately, it is standard practice to add clayey size (less than 4 microns) particles and other small size particles to slurries used in earth borehole operations and the fluid loss of these slurries may be readily reduced to the desired values.

(2) The particulated matter is essentially inert to the fluids encountered in the borehole including the liquid slurry to which the particulated matter has been added. The particles do not degrade enough to cause the spurt of the admixture to increase and exceed the desired value after being exposed to such fluids for a period of at least one day and usually after a period of between one and 45 days. The temperature resistance of the particulated matter and of the admixture is such that, upon exposure to such fluids and such temperatures as are encountered in the well bore for a period of between one to 45 days, the admixture retains the desired spurt value. In general, the test temperature limits in Table I are needed only if the particulated material used is degraded when subjected to elevated temperatures. As will be noted in Table II, may materials having the necessary chemical resistance and strength requirements at low temperatures are unsuited for use in the more severe areas of lost circulation where temperature becomes an important factor. The results of Table I are more reliable if the particles in the admixture are subjected to the temperatures shown for a period of between one and 45 days.

Table II shows test results on some materials tested. In this table, the spurt range is for cracks between 0.02 inch and 0.06 inch. The size range of the particles shows the screen size through which the particles pass and the 100 mesh screen on which they are retained. As illustrated, many different admixtures were subjected to different temperatures, pressures, or both, to determine the effects of time on the spurt value exhibited by the admixture. In general, it was found that the temperature resistance and strength of the largest size particles is the most important. In Table II, the material forming the largest size particles is given first. For many particulated solid materials, the spurt value increased adversely within the first 24 hours. In general, these materials are not given in Table II. Other materials appeared satisfactory after the first day, but suffered severe aging effects within 14 days; for example, diallyl phthalate particles and diallyl phthalate coated walnut shells. Thus, a check of the spurt value of the admixture after subjecting the mixture to temperature, pressure, or both, was used to determine whether or not the particulated matter degraded, tended to soften, agglomerate, change in particle size and distribution, dissolve, lose strength, adversely affect the mud properties and the like.

It was also found that many particulated materials heretobefore used to prevent or cure loss of circulation during earth borehole drilling were too weak to be used as the large size particles of this invention. For example, in Table II, anthracite coal, limestone, ground plastic dishes and pig bristles are too weak. Other materials not shown were ground rubber, wood shavings, cellophane, cotton seed hulls, cotton linters, sand and glass. These materials might be used in less stringent cases as small particles, but it is best to select the better and safer materials.

TABLE II

| Material | lbs./bbl. | Size Range (U.S. Sieve Ser.) (Inches) | Spurt Range and Pressure | Temp., °F. | Remarks |
| --- | --- | --- | --- | --- | --- |
| Epoxy and phenolic coated walnut shells, rounded walnut shells, fine mica. | 80 | (10–100) (.0787–.0059) | 100 to 320, 3,000 p.s.i. | 300 | After bombing 11 days. Spurt greater after 22 days. |
| Do | 75 | (10–100) (.0787–.0059) | 49 to 63, 1,500 p.s.i. | Room | |
| Do | 75 | (10–100) (.0787–.0059) | 53 to 130, 1,500 p.s.i. | 294 | After bombing 22 days. |
| Do | 75 | (10–100) (.0787–.0059) | 95 to 400, 3,000 p.s.i. | 294 | After bombing 22 days. Some types failed. |
| Diallyl phthalate, coated walnut shells, fine mica. | 80 | (10–100) (.0787–.0059) | 50 to 100, 3,000 p.s.i. | Room | After 9 days at 320° F. failed through 0.03 inch crack. At room temperature spurt was 65 through 0.03 inch crack. |
| Coated walnut shells, almond shells, fine mica. | 80 | (10–100) (.0787–.0059) | 45 to 60 1,500 p.s.i. | 250 | After bombing 5 days. |
| Do | 80 | (10–100) (.0787–.0059) | 60 to 100, 1,500 p.s.i. | 300 | After bombing 22 days. Weak at 3,000 p.s.i. |
| Marble fine mica | 100 | (8–100) (.0937–.0059) | Over 300, 3,000 p.s.i. | Room | |
| Do | 120 | (8–100) (.0937–.0059) | 200 to 310, 3,000 p.s.i. | Room | After bombing 5 days. Degrades some muds. |
| Mixed plastic flashings | 80 | (10–100) (.0787–.0059) | 50 to 100, 1,000 p.s.i. | Room | Part disintegrates at 300° F. |
| Do | 80 | (10–100) (.0787–.0059) | 70 to 150, 3,000 p.s.i. | Room | Do. |
| Cured black phenol, formaldehyde #1 | 80 | (10–100) (.0787–.0059) | 50 to 80, 1,000 p.s.i. | Room | |
| Do | 80 | (10–100) (.0787–.0059) | 110 to 200, 3,000 p.s.i. | Room | Weaker after 11 days at 300° F. Through 0.03 inch crack spurt increased 50%. |
| Cured black phenol, formaldehyde #2. | 80 | (10–100) (.0787–.0059) | 70 to 200, 1,500 p.s.i. | Room | |
| Do | 80 | (10–100) (.0787–.0059) | Over 300, 3,000 p.s.i. | Room | Fails through larger cracks. |
| Walnut shells, laminated phenolic | 30 | (8–100) (.0937–.0059) | Over 300, 2,000 p.s.i. | Room | Insufficient concentration. |
| Walnut shells, pecan shells, laminated formica. | 30 | (10–100) (.0787–.0059) | Over 300, 1,500 p.s.i. | Room | Do. |
| Rounded walnut shells, fine mica | 80 | (10–100) (.0787–.0059) | 48 to 100, 1,500 p.s.i. | 155 | Withstood 5,000 p.s.i. at 155° F. After 16 days at 225° F. withstood 1,500 p.s.i., but at 2,800 p.s.i. failed through 0.05 inch crack. |
| Do | 80 | (7–100) (.111–.0059) | 38 to 75, 1,500 p.s.i. | Room | |
| Do | 80 | (7–100) (.111–.0059) | 75 to over 300, 3,000 p.s.i. | Room | Over 300 through 0.02 inch crack and less than 300 through larger cracks. |
| Walnut shells, almond shells, fine mica. | 80 | (10–100) (.0787–.0059) | 45 to 150, 1,500 p.s.i. | 250 | After bombing 6 days. Weakens after 8 days. Almond shells absorb water from mud. |
| Walnut shells, almond shells, laminated phenolic. | 42.4 | (10–100) (.0787–.0059) | 160 to 210, 1,500 p.s.i. | Room | Concentration too low even though laminated phenolic has a lower specific gravity than mica. |
| Polyethylene, rounded walnut shells, fine mica. | 100 | (7–100) (.111–.0059) | 60 to 100 1,500 p.s.i. | Room | Polyethylene soft at 300° F. |
| Field mud containing standard graded lost circulation material. | 4.1 | (12–100) (.0661–.0059) | Over 300, 1,500 p.s.i. | Room | Insufficient concentration. |
| Ground plastic dishes, fine mica | 100 | (10–100) (.0787–.0059) | Failed, 1,500 p.s.i. | Room | Too weak. |
| Pig bristles, walnut shells, almond shells, fine mica. | 80 | (⅜–100) (.375–.0059) | 35 to failure, 1,500 p.s.i. | Room | Failed through cracks above 0.05 inch. Pig bristles too weak. |
| Cured filled epoxy, fine mica | 80 | (10–100) (.0787–.0059) | 75 to 110, 1,500 p.s.i. | Room | Weakens at 300° F. since after bombing 11 days, spurt doubled through 0.03 inch crack. Failed at 5,000 p.s.i. through 0.05 inch crack. |
| Anthracite coal, fine mica | 140 | (8–100) (.0937–.0059) | Over 155 and failed, 3,000 p.s.i. | Room | Failed through 0.038 inch crack. Anthracite is too weak. |
| Limestone, fine mica | 100 | (8–100) (.0937–.0059) | 115 to failure, 3,000 p.s.i. | Room | Failed through 0.05 inch crack. |
| Polypropylene, rounded walnut shells, fine mica. | 80 | (10–100) (.0787–.0059) | 75 to over 300, 3,000 p.s.i. | Room | At 3,000 p.s.i., failed through 0.04 inch crack, but withstood 1,500 p.s.i. Polypropylene weak at 300° F. |
| Nylon, rounded walnut shells, fine mica. | 80 | (8–100) (.0787–.0059) | 60 to 150, 3,000 p.s.i. | Room | Strong at low temperatures. Extrudes at 6,000 p.s.i. Weakens at 300° F. |
| Black phenolic, rounded walnut shells, fine mica. | 80 | (10–100) (.0787–.0059) | 48 to 150, 3,000 p.s.i. | Room | After 9 days at 320° F., spurt through 0.03 inch increased from 70 to 130. Degrades in some muds. |
| Polycarbonate resin, rounded walnut shells, fine mica. | 80 | (7–100) (.111–.0059) | 35 to 100, 3,000 p.s.i. | Room | Withstood 7,400 p.s.i. at 300° F., but disintegrates in high pH mud. |
| Diallyl phthalate #1, fine mica | 90 | (8–100) (.0937–.0059) | 100 to 150, 3,000 p.s.i. | Room | Withstood 6,000 p.s.i. After 9 days at 300° F. too weak. |
| Diallyl phthalate #2, fine mica | 90 | (8–100) (.0937–.0059) | 70 to 100, 3,000 p.s.i. | Room | Withstood 6,000 p.s.i. |
| Do | 90 | (8–100) (.0937–.0059) | 120 to 200, 3,000 p.s.i. | 300 | After bombing 9 days. |

As illustrated in Table II, it was also found that many particulated materials would be suitable for short term or low temperature use, but would not be suitable for widespread or high temperature or long term use or in some muds because in the method of this invention these materials degraded. Materials suitable for less exacting use, although unsuitable for widespread or long term or high temperature use in all wells, were walnut shells, almond shells, pecan shells, straight phenolic resin, polyethylene, marble chips, expanded perlite and diallyl phthalate. Other materials showing varying degrees of greater success at temperatures between 150° F. and 300° F. and test pressures between 1500 and 3000 pounds per square inch were cured filled epoxy, phenolic and epoxy coated walnut shells, polycarbonate resin (except in high pH muds), phenoxy resins, polypropylene with and without asbestos filler, nylon and stabilized polyvinyl chloride. The most reasonably priced material found suitable for widespread use in all areas in all sizes at temperatures above 300° F. and test pressures of at least 3000 pounds per square inch was a phenolic flash material which is a by-product of phenolic molding processes wherein the phenolic resin is specially cured and heated with a wood flour or fiber glass filler of about fifty percent by volume of the final flash. Phenolic flash is a phenol-aldehyde with a filler material fully cured to an infusible, insoluble C-stage by cross-linking or network formation. The most common phenol-aldehyde resin is phenol-formaldehyde produced by condensation reaction of formaldehyde added to phenol at its active ortho and para positions at temperatures and reaction times that produce a C-stage network. Acid or alkaline catalysts are usually used. Test results using a preferred embodiment or phenolic flash are given below in Table III.

TABLE III

Material: Phenolic Flash.
API Fluid Loss: Less than 5 cc.
Concentration: 22.5% by vol. (113 lbs./bbl.) Subjected to 300° F. for 20+ days.

| Size Distribution | | Cum. percent by vol. | Crack Width, inch | Spurt at 3,000 p.s.i |
|---|---|---|---|---|
| Through | Retained On | | | |
| 10 | 14 | 13.3 | 0.01 | 35 |
| 14 | 20 | 23.2 | 0.02 | 30 |
| 20 | 30 | 46.6 | 0.03 | 30 |
| 30 | 40 | 60.0 | 0.04 | 35 |
| 40 | 100 | 100.0 | 0.05 | 39 |
| | | | 0.06 | 42 |
| | | | 0.07 | 143 |

(3) The particle size and size distribution of the particles depend on the desired spurt value for the range of crack widths through which the admixture is to exhibit this desired spurt value. Preferably, the largest size particles are no larger than needed to do the job because increasing the size of the largest size particles increases the concentration of particles for reasons hereinafter discussed. Increasing the size of the largest size particles also increases the spurt through the smaller crack widths, e.g., a 0.02 inch crack. The largest size particles must be large enough to hold 1500 pounds per square inch and greater across a crack 0.06 inch wide. The largest size particles should, therefore, be at least U.S. Sieve Series Screen 10 (0.0787 inch). They may be larger provided that the other features of this invention are maintained. It is necessary to define the largest size particles. Generally, there is a small amount of undesirably large particles in any batch of particles which are not considered when designing a particular admixture according to the principles set forth herein. These overlarge particles are excluded from any consideration of the properties of the admixture by the following definition of the largest size particles. This definition of the largest size particles is also used in defining the preferred size range and size distribution of the particles used herein. It is common practice to define the largest size particles in terms of the size of a standard U.S. Sieve Series Screen opening through which at least 98 percent by volume of the particles just pass. As used herein, therefore, the size of the largest size particles of the batch of solid particles is defined as the size of the opening of the smallest size standard U.S. Sieve Series Screen through which at least 98 percent by volume of the particles will pass. In other words, if 98 percent by volume of the particles will pass through a 10 mesh screen with sieve opening of 0.0787 inch, but 98 percent of the particles will not pass through a 12 mesh screen with a sieve opening of 0.0661 inch, the size of the largest size particles is 10 mesh or 0.787 inch. It should be noted that 98 percent of the particles will pass through an 8 mesh or larger screen if they pass through a 10 mesh screen, but since a 10 mesh screen is the smallest U.S. Sieve Series Screen through which at least 98 percent of the particles will pass, this is designated as the size of the largest size particles. Since in this example all of the particles under consideration pass through a 10 mesh screen, there are at most very few particles as large as 0.0787 inch. In general, when the above definition for the largest size particle is used, the maximum crack width which the largest size particles will safely bridge and hold necessary pressure and maintain a low spurt is about 75 percent of the size of the largest size particles. In other words, the largest size particles should be at least 0.0787 inch or 10 mesh if the spurt is to be low through all cracks between 0.02 inch and 0.06 inch. As mentioned, the maximum size of the largest size particles is not overly important so long as the spurt of the admixture is below 300, or 100, or 60, whichever is required, through all cracks whose widths are between 0.02 inch and 0.06 inch. If the size of the largest size particles is increased, the spurt through the small crack widths is increased. For example, at 1500 pounds per square inch through a crack 0.03 inch wide, when 10 pounds per barrel of 10–12 mesh particles were substituted for 10 pounds per barrel of 16–18 mesh particles, the spurt increased from 55 to 750. The mixture also contained 60 pounds per barrel of 18 to 100 mesh particles. By way of further example, if the largest size particles are 0.25 inch, the admixture will not exhibit a low spurt through all crack widths between 0.02 inch and 0.06 inch unless either the amount of very large particles is small or an enormously large volume of concentration of particles is used and even then it would be doubtful that a uniformly low spurt through 0.02 inch to 0.06 inch cracks would be obtained. What has been applied to spurts below 300, applies greater to spurts of less than 100 and 60. For most formations being drilled, the size of the largest size particles is usually the size needed to bridge crack mouths between 0.02 inch and 0.07 inch, that is, the largest particles will be 8 mesh or 10 mesh and the admixture will usually exhibit a spurt value of less than 60 at a test pressure of at least 1500 pounds per square inch for all size crack widths between 0.04 and 0.06 inch.

As to the particle size distribution, the spurt of an admixture was affected by the particle size range and the size distribution of the particles within the range. In order to obtain a low spurt, it was necessary to select different size cuts of particulated matter and combine these cuts into the needed batch of solid particles. This is what is meant by graded size distribution. Two examples of changing the particle size distribution are shown in Tables IV and V.

TABLE IV

| | Particle Size | Lbs. number/bbl. | Crack Width (inch) | Spurt 1,500 p.s.i. |
|---|---|---|---|---|
| Sample 1 | 12–20 | 15 | 0.02 | 200 |
| | 20–30 | 15 | | |
| | 30–100 | 20 | | |
| Sample 2 | 12–20 | 15 | 0.02 | 100 |
| | 20–30 | 15 | | |
| | 30–100 | 40 | | |
| Sample 3 | 12–20 | 15 | 0.02 | 68 |
| | 20–30 | 15 | | |
| | 30–100 | 60 | | |

TABLE V

| Crack Width (inch) | Spurt at 1,500 p.s.i. Complete Range of Particles | Spurt at 1,500 p.s.i. With 20-30 inch Particles Removed |
| --- | --- | --- |
| 0.02 | 57 | 180 |
| 0.03 | 40 | 105 |
| 0.04 | 40 | 87 |
| 0.05 | 38 | 120 |

It was found that the performance of the admixture through 0.02 inch to 0.06 inch cracks improved when the size distribution of the batch of solid particles added to the base liquid slurry approached the following relationship $$\frac{V}{V_t} = \frac{\ln \frac{S}{0.0787}}{\ln \frac{S_{min}}{0.0787}}$$

wherein $S_{min}$ is either 0.0059 inch (100 mesh) or 0.0035 inch (170 mesh), S is the size of the opening in inches of a standard U.S. Sieve Series Screen between 0.0787 inch and $S_{min}$, V is the volume of particles retained on said screen of size S, and $V_t$ is the total volume of the solid particles in the batch passing through a 10 mesh screen and retained on screen $S_{min}$. This size distribution minimized the amount of particles for the range of crack widths between 0.02 inch and 0.06 inch provided that all of the particles between $S_{min}$ and 0.0787 inch are strong under the test conditions.

(4) The shape of the particle is selected to give the desired bridge strength and to reduce the concentration of particles needed. Particles as large as 0.5 of the largest size particles are generally spherically shaped. For example, rounded walnut shells were stronger than crushed walnut shells.

(5) The minimum amount of particles needed depends first on the desired spurt value and range of crack widths. Naturally, the lower the spurt, the greater the concentration of particles needed. This is illustrated by comparing Tables II and III. The minimum crack width range is between 0.02 inch and 0.06 inch. An increase in the size range of the particles increases the amount of particles needed. For example, regardless of the density of the particles, 15 pounds per barrel will never provide enough particles to lower the spurt to 300 through all cracks whose widths are between 0.02 and 0.06 inch. A concentration of 60 pounds per barrel could lower the spurt to 300 for the crack widths of 0.02 inch to 0.06 inch provided that the size range of the particles is kept small enough (i.e., 8 to 100 mesh); however, if the largest size particles were as large as 0.25 inch or larger, a concentration of 60 pounds per barrel would usually be inadequate unless the concentration of the large particles was small and most of the 60 pounds per barrel was in 10-100 mesh range. As a result, the concentration required depends on the size range of the particles. By way of illustration of the concentrations required for a mix containing graded walnut shells and formica between one-eighth inch and 0.0059 inch, a 15 pound per barrel mix through a 0.025 inch crack had a spurt of 750, a 30 pound per barrel mix had a spurt of 360 and 60 pound per barrel mix had a spurt of 240. Two examples of 30 pound per barrel mixes are given in Table II. This concentration was not sufficient. The required concentration also depends on the test pressure and strength of the larger particles. For example, an 80 pound per barrel mix of walnut shells and fine mica between 10 and 100 mesh through a 0.03 inch crack exhibited spurts of 60 at 1000 pounds per square inch, 70 at 1500 pounds per square inch, 87 at 2000 pounds per square inch and 110 at 3000 pounds per square inch. The required concentration also depends on the relative concentrations between the various size particles because, as shown previously, increasing the size of one size group of particles affects the spurt through cracks whose widths correspond to the other size groups of particles. In any event, the amount of particles needed is determined by the volume percent of the particles in the admixture and not the weight of the particles. Unless the weight of each type of particle is converted to a percent by volume, it is meaningless to base the amount of particles needed on a weight basis as has been done in the past. For the spurt to be less than 300 for all cracks between 0.02 inch and 0.06 inch, it was found that the minimum percent by volume of the final admixture of the particles passing through a 0.0787 inch screen (10 mesh) and retained on a 0.0059 inch screen (100 mesh) should be at least 5 percent, and for the spurt to be 100 or less, the volume percent of these particles should be at least 10 percent. The volume percent will be about at least 15 percent when the particle size range is between 10 and 100 mesh and the spurt is less than 60. It was also found that in addition to having a low fluid loss, the base slurry to which the particles are added should contain a sufficient volume percent of particles having a size less than 170 mesh, i.e., between clay size (less than 2 to 4 microns) and 200 mesh (0.0029 inch), to quickly plug the bridge formed by the larger particles. For a spurt of less than 300, the volume percent of the final admixture of these small particles in the slurry will be at least one percent and for a spurt of less than 100, the volume percent will be at least 2 percent. For example, an admixture containing 80 pounds per barrel of walnut shells and fine mica with a size range of 10-100 mesh and having an API fluid loss of 5.6 cc., had a spurt at a test pressure of 750 pounds per square inch through a 0.02 inch crack of greater than 400; but when 20 pounds per barrel of fluid loss control particles between clay and 0.0029 inch were added, the spurt dropped to below 100 through the same crack.

(6) The base liquid slurry and batch of solid particulated matter are thoroughly mixed to form an essentially homogeneous admixture. The homogeneity of this admixture remains relatively constant during use of the admixture in the borehole.

(7) Under all circumstances, the strength of the bridge formed by the particles is capable of withstanding pressure differentials of at least 1500 pounds per square inch. Depending upon the conditions encountered in the borehole, the bridge may be required to withstand pressures between 1500 and 10,000 pounds per square inch and greater. It is the bridge strength that is important to the function of the admixture, not the strength of the individual size particles. For this reason, no attempt has been made to place limits on the strength of the individual particles of particulated matter. As noted previously, the strength of the bridge is also indicative of other properties of the admixture. The bridge should withstand 1500 pounds per square inch if these other properties as well as the bridge strength are to be adequate. Under most conditions, the bridge should withstand 1500 pounds per square inch after the admixture has been subjected for a period of at least one day to a temperature of at least 150° F. For more critical formations, the pressure differential across the bridge may exceed 3000 pounds per square inch. In such cases, the bridge should be able to withstand pressure differentials of at least 3000 pounds per square inch. Also in more critical areas, the temperature may be as high as 350° F. In general, if the bridge withstands 3000 pounds per square inch after being subjected to a temperature of 300° F., the bridge is suitable for all but a few known formations. By way of summary, the bridge formed by the admixture will be relatively thin, very strong and made up of particles highly resistant to temperature and pressure differentials when subjected to the fluids and temperatures encountered in the borehole for periods of between one and 45 days.

The process of this invention involves preparing an admixture exhibiting the above-described properties. The admixture will, therefore, have a spurt of less than 300 at a test pressure of 1500 pounds per square inch. This admixture is injected into an earth borehole thence into contact with a subsurface earth formation. The formation is in contact with this special treating admixture throughout a predetermined time that cracks in the formation could cause the loss of conventional liquids or liquid-solid mixtures used in subsurface earth borehole operations.

In accordance with the above process, during earth borehole drilling through exposed formations susceptible of causing lost circulation, there is circulated a drilling fluid admixture having the above properties. In general, a typical drilling mud of low water loss is prepared. This mud is then mixed with the proper amount of graded particles to reduce the spurt of the admixture to the desired level. The resulting admixture is circulated through the borehole during drilling. The spurt of the circulating admixture is maintained in a number of ways depending on the particular drilling system. Usually, it is necessary to periodically discard part of the circulated admixture and add batches of fresh admixture.

The size of the particles in the fresh batch of added admixture will vary according to the spurt exhibited by the circulating admixture. In many cases, it is necessary to add only particles in a narrow size cut. The size and amount of the particles needed to maintain the desired spurt are shown by periodically testing the spurt of the circulating admixture over the desired range of crack widths. For this reason, it is generally necessary to have on hand at the well site select, unmixed amounts of the different size particles rather than premixing all of the different size particles prior to starting drilling.

It will be understood that various changes in the details, materials, particle size distributions and amounts, and spurt values which have been herein described and illustrated in order to explain the nature of the invention, may be made by those skilled in the art within the principle and scope of the invention, as expressed in the appended claims.

What is claimed is:

1. An improved method of drilling at least a part of an earth borehole comprising injecting into said borehole an admixture of a base liquid slurry containing at least one percent by volume of small particles having a size distribution between clay size and 0.0029 inch and having an API fluid loss of less than 50 cc. to which has been added solid particles of graded size distribution, strength, chemical resistance and amount such that the spurt of said admixture is less than 300 at a test pressure of 1500 pounds per square inch through all crack widths between 0.02 inch and 0.06 inch, the largest size particles of said admixture being at least U.S. Sieve Series Screen 10, the amount of said solid particles having a size greater than 0.0059 inch and less than 0.0787 inch being at least five percent by volume of said admixture, and causing said admixture to circulate and contact the wall of said borehole during said drilling of at least a part of said borehole.

2. The improved method of claim 1 wherein the spurt of the admixture is less than 300 at a test pressure of 1500 pounds per square inch after subjecting the admixture to a temperature of 150 degrees Fahrenheit for a period between one day and 45 days.

3. The improved method of claim 1 wherein the spurt of the admixture is also less than 100 at a test pressure of 1500 pounds per square inch through a crack whose width is between 0.02 inch and 0.06 inch.

4. The improved method of claim 1 wherein the spurt of the admixture is less than 100 at a test pressure of 1500 pounds per square inch for all crack widths between 0.02 inch and 0.06 inch.

5. The improved method of claim 4 wherein the amount of solid particles having a size greater than 0.0059 inch and less than 0.0787 inch is at least 10 percent by volume of said mixture, and the base liquid slurry contains at least two percent by volume of small particles having a size distribution between clay size and 0.0029 inch and has an API fluid loss of less than 10 cc.

6. The improved method of claim 5 wherein the gradation of the solid particles passing through a standard U.S. Sieve Series Screen having a sieve opening of 0.0787 inch and retained on a standard U.S. Sieve Series Screen having a sieve opening of 0.0059 inch approximates the relationship $$\frac{V}{V_t} = \frac{\ln \frac{S}{0.0787}}{\ln \frac{0.0059}{0.0787}}$$

wherein S is the size of the opening in inches of a standard U.S. Sieve Series Screen between 0.0787 and 0.0059 inch, V is the volume of the particles retained on said screen of size S, and $V_t$ is the total volume of said solid particles passing through said screen of size 0.0787 inch and retained on said screen of size 0.0059 inch.

7. The improved method of claim 5 wherein the spurt of the admixture is less than 100 at a test pressure of 3000 pounds per square inch.

8. The improved method of claim 5 wherein the spurt of the admixture is less than 100 at a test pressure of 3000 pounds per square inch after subjecting the admixture to a temperature of 300 degrees Fahrenheit for a period between one day and 45 days.

9. The improved method of claim 5 wherein the size of the largest size particles is between U.S. Sieve Series Screen 10 and the U.S. Sieve Series Screen 8.

10. The improved method of claim 5 wherein the spurt of the admixture is also less than 60 at a test pressure of 1500 pounds per square inch for all crack widths between 0.04 inch and 0.06 inch.

11. The improved method of claim 4 wherein the spurt of the admixture is less than 60 at a test pressure of 1500 pounds per square inch for all crack widths between 0.02 inch and 0.06 inch.

12. The improved method of claim 11 wherein the amount of solid particles having a size between 0.0059 inch and 0.0787 inch is at least 15 percent by volume of said admixture.

13. The improved method of claim 12 wherein the gradations of the solid particles passing through a standard U.S. Sieve Series Screen having a sieve opening of 0.0787 inch and retained on a standard U.S. Sieve Series Screen having a sieve opening of 0.0059 inch approximates the relationship $$\frac{V}{V_t} = \frac{\ln \frac{S}{0.0787}}{\ln \frac{0.0059}{0.0787}}$$

wherein S is the size of the opening in inches of a standard U.S. Sieve Series Screen between 0.0787 inch and 0.0059 inch, V is the volume of the particles retained on said screen of size S, and $V_t$ is the total volume of said solid particles passing through said screen of size 0.0787 inch and retained on said screen of size 0.0059 inch.

14. The improved method of claim 11 wherein the spurt of the admixture is less than 60 at a test pressure of 3000 pounds per square inch.

15. The improved method of claim 14 wherein the spurt of the admixture is less than 60 at a test pressure of 3000 pounds per square inch after subjecting the admixture to a temperature of 300 degrees Fahrenheit for a period between one day and 45 days.

References Cited

UNITED STATES PATENTS

| | | | |
|---|---|---|---|
| 2,626,779 | 1/1953 | Armentrout | 175—72 X |
| 2,779,417 | 1/1957 | Clark et al. | 166—31 |
| 2,873,250 | 2/1959 | Scott | 252—8.5 |
| 2,912,380 | 11/1959 | Groves | 252—8.5 |
| 2,943,679 | 7/1960 | Scott et al. | 252—8.5 |
| 2,943,680 | 7/1960 | Scott et al. | 252—8.5 |
| 3,042,608 | 7/1962 | Morris | 252—8.5 |

OTHER REFERENCES

Rogers: Composition and Properties of Oil Well Drilling Fluids, second edition, published 1953 by Gulf Pub. Co. of Houston, Tex., pp. 356–364.

STEPHEN J. NOVOSAD, Primary Examiner

UNITED STATES PATENT OFFICE
CERTIFICATE OF CORRECTION

Patent No. 3,496,902　　　　　　　　　Dated Feb. 24, 1970

Inventor(s) James M. Cleary, Loyd R. Kern, and Thomas K. Perkins

It is certified that error appears in the above-identified patent and that said Letters Patent are hereby corrected as shown below:

Column 4, line 20 "particle" should read ---particles---. Column 6, line 18 "cranks" should read ---cracks---. Column 6, line 24 "migatable" should read ---migratable---. Column 6, line 49 should have beginning of parentheses in front of "as", should read ---(as---. Column 7, line 59 "widgths" should read ---widths---. Column 7, line 68 "understading" should read ---understanding---. Column 8, line 11 "hereinbefore" should read ---hereinafter---. Column 8, line 16 should have period after "admixture", should read ---admixture.---. Column 9, line 47 "foremd" should read ---formed---. Column 10, line 73 "may" should read ---many---. Column 13, line 23 "fiber glass" should read ---fiberglass---. Column 13, line 32 "or" should be ---of---. Column 13, Table III in column entitled "Cum. percent by vol.", second line in that column reads "23.2", should read ---33.2---. Column 14, line 12 "0.787" should read ---0.0787---. Column 14, line 44 "of" should read ---or---.

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents